2,832,798

PREPARATION OF ACRYLONITRILE FROM β,β'-OXYDIPROPIONITRILE

Lorence Rapoport, Stamford, Conn., assignor to American Cyanamid Company, New York, N. Y., a corporation of Maine No Drawing. Application June 30, 1955
Serial No. 519,261

10 Claims. (Cl. 260—465.9)

This invention relates to a process of transforming β,β'-dicyano-diethyl ether into acrylonitrile and more particularly in the transformation of the crude product which is obtained as a by-product in the cyanoethylation of cotton.

The cyanoethylation of cotton which has achieved great interest in recent years has presented a serious problem because in the processes used, acrylonitrile is reacted with cotton in the presence of aqueous caustic alkali and as a result side reactions have taken place, including the transformation of acrylonitrile by means of caustic alkali and water in a β,β'-dicyano-diethyl ether which is sometimes referred to as β,β'-oxydipropionitrile. In many cases the amount of acrylonitrile which is transformed into oxydipropionitrile is several times that which is actually caused to react with the cotton in the cyanoethylation process. Accordingly, the large amount of oxydipropionitrile produced presents a very serious economic problem. Unreacted acrylonitrile can be recovered fairly easily because of the great difference in boiling point between acrylonitrile and oxydipropionitrile but the crude oxydipropionitrile itself does not have an extensively developed field of use.

According to the present invention I have found that it is possible by using basic catalysts such as the salts of weak inorganic or organic acids with stronger bases, the oxydipropionitrile can be transformed into acrylonitrile at elevated temperatures and very high yields and in a single step.

It is an advantage of the present invention that no purification of the oxydipropionitrile is necessary as the crude product as it is recovered in the cyanoethylation process is dehydrated just as readily as chemically pure material. Because of the very low boiling point of the acrylonitrile produced its separation of recovery presents no particular problem.

The temperature used is not critical and optimum temperature ranges will vary with different catalysts. In general, the more strongly basic catalysts will give good results at somewhat lower temperatures than the less strongly basic catalysts. The temperature used must, of course, be markedly above the boiling point of water and excellent results are obtained from somewhat below 200° C. to temperatures of 210–220° C. and higher. In general, the lowest temperature range should be used which still gives a rapid production of acrylonitrile as excessive temperatures can result in some loss in yield and purity. The fact that the temperature is not critical results in a very simple operating control as an extensive temperature range may exist in the equipment without adverse effects.

The particular catalyst used is also not critical. Excellent results are obtained with sodium formate which is representative of one of the less strongly basic catalysts and so gives its best results near or slightly above 200° C. Good results are also obtainable with potassium formate, sodium and potassium acetates and even with inorganic basic salts such as sodium phosphates, sodium tetraborate, and the like. In general, sodium salts, although for optimum results they may require slightly higher temperature, are preferred because of their cheapness. The additional cost represented by the corresponding potassium salts is ordinarily not justified. They are, however, useful and operative and are included in the present invention. Alkaline earth metal salts are also useful where their solubility is adequate.

The invention will be illustrated in greater detail in conjunction with the following specific examples in which the parts are by weight unless otherwise specified.

Example 1

150 parts of crude β,β'-oxydipropionitrile recovered from the cyanoethylation of cotton with acrylonitrile are gradually added to 25 parts of sodium formate at a temperature of 195–210° C. Dehydration to acrylonitrile proceeds very rapidly and the acrylonitrile formed is continuously and rapidly removed, the vapors being condensed to produce liquid acrylonitrile. A yield of 94% is obtained.

Since the vapors contain water as well as acrylonitrile, the recovery step can be effected either by straight condensation or by fractional condensation. The latter should be employed where anhydrous acrylonitrile is needed. However, where the acrylonitrile is to be used in the cyanoethylation of cotton a moderate water content is unobjectionable as the process of cyanoethylation involves using aqueous caustic alkali and so condensation of the acrylonitrile with part or all of the water constitutes a most economical procedure.

Example 2

The procedure of Example 1 is repeated utilizing a corresponding amount of potassium formate instead of sodium formate. The temperature is slightly lower from 190–205° C. and the yields are substantially the same.

Example 3

The procedure of Example 1 is followed replacing the sodium formate with corresponding amounts of sodium and potassium acetate. Yields obtained are substantially the same and the temperature range for sodium acetate is the same as for sodium formate. Potassium acetate permits slightly lower temperatures of 190–205° C.

Example 4

The procedure of Example 1 is repeated replacing the sodium formate with a corresponding amount of sodium tetraborate. The temperatures are somewhat lower from 180–200° C. and the yield of acrylonitrile obtained is only a little lower.

I claim:

1. A process of producing acrylonitrile which comprises subjecting β,β'-oxydipropionitrile to contact with a catalyst in the form of a salt which, in aqueous solution, shows an alkaline reaction at temperatures from about 180–220° C.

2. A process according to claim 1 in which the β,β'-oxydipropionitrile is a crude product recovered from the cyanoethylation of cotton with acrylonitrile and caustic alkali.

3. A process according to claim 2 in which the catalyst is an alkali metal salt of a lower fatty acid.

4. A process according to claim 3 in which the catalyst is sodium formate.

5. A process according to claim 1 in which the catalyst is an alkali metal salt of a lower fatty acid.

6. A process according to claim 5 in which the catalyst is sodium formate.

7. A process according to claim 1 in which the temperature range is about 200° C.

8. A process according to claim 7 in which the oxydipropionitrile is a crude product recovered from the cyanoethylation of cotton with acrylonitrile and aqueous caustic alkali.

9. A process according to claim 8 in which the catalyst is an alkali metal salt of a lower fatty acid.

10. A process according to claim 9 in which the catalyst is sodium formate.

References Cited in the file of this patent

UNITED STATES PATENTS

| | | |
|---|---|---|
| 2,378,236 | Miller | June 12, 1945 |
| 2,448,979 | Hopff et al. | Sept. 7, 1948 |
| 2,461,492 | Carpenter et al. | Feb. 8, 1949 |
| 2,500,403 | Davis | Mar. 14, 1950 |
| 2,700,640 | Journeay | Nov. 13, 1956 |